Aug. 6, 1957     H. E. RIORDAN ET AL     2,802,122

MAGNETIC DAMPER

Filed Dec. 3, 1954

INVENTORS
HUGH E. RIORDAN
EDWARD J. HAYES

BY

ATTORNEYS

United States Patent Office 2,802,122
Patented Aug. 6, 1957

2,802,122

MAGNETIC DAMPER

Hugh E. Riordan and Edward J. Hayes, Silver Spring, Md., assignors to the United States of America as represented by the Secretary of the Navy Application December 3, 1954, Serial No. 473,059

1 Claim. (Cl. 310—93)

The present invention relates generally to damping systems, and more particularly to an improved magnetic arrangement for damping motion of a body.

The servo systems for use in missile control mechanisms require extremely effective damping because the delays in carrying out a missile maneuver corresponding to a particular command signal must be minimized. Typical prior existing magnetic dampers used in missile servo systems comprised a disc of magnetic material mounted on a rotating shaft of the system with permanent magnets arranged about the disc. The rotation of the disc, which was arranged in the magnetic field thus created, would be impeded by the eddy currents induced in the disc as it cut the lines of flux. To increase the damping effect provided by this arrangement, it was necessary to increase the radius of the disc and the size of the magnets. This resulted in an undesirable increase in the inertia of the disc.

One of the objects of this invention is to provide a magnetic damper which has an improved relationship between the amount of damping and the inertia of the moving element.

Another object of this invention is to provide a magnetic damper having a reduced moment of inertia.

Still another object of this invention is to provide an improved magnetic arrangement which is economical to manufacture and which is efficient and reliable in operation.

Other objects and many of the attendant advantages of this invention will be apparent by reference to the following detailed description, taken in conjunction with the accompanying drawing, in which.

Figure 1:
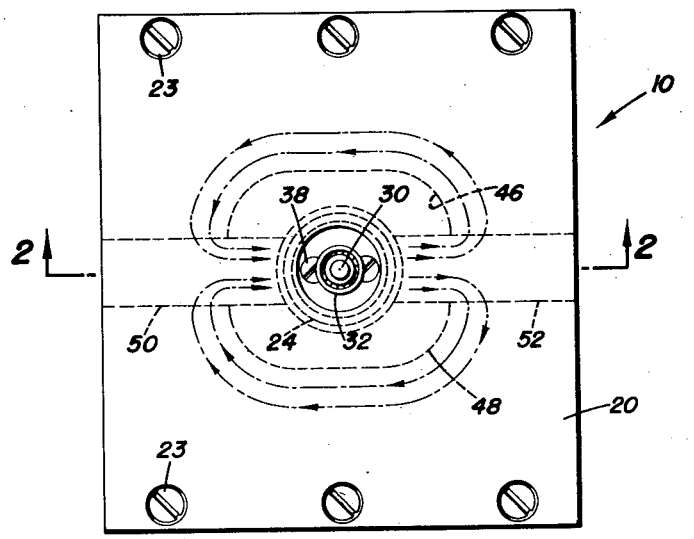
Fig. 1 is a top view of the magnetic damper.
Figure 2:
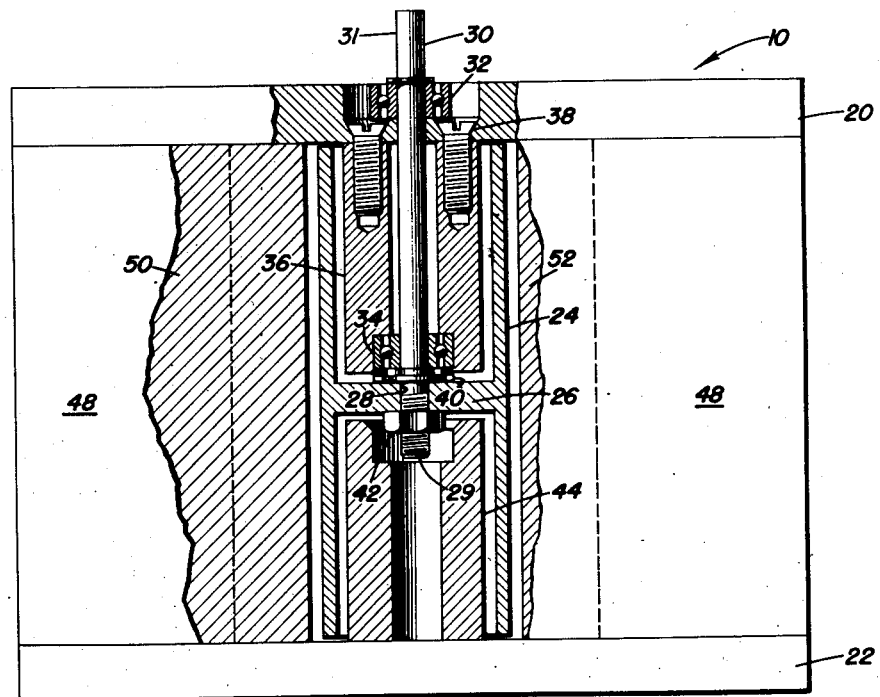
Fig. 2 is an enlarged side elevation with parts broken away.

In accordance with the invention, there is provided a magnetic damper which comprises a cylinder mounted on a rotatable shaft the motion of which it is desired to damp. Permanent magnets are arranged adjacent the cylinder, with pole pieces interposed between the magnets and arranged to provide a magnetic field havingf lines of flux that are cut by the rotating cylinder, thereby inducing eddy currents in the cylinder which oppose its rotation. Additional means including sleeves of magnetic material are positioned inside the cylinder to reduce the reluctance of the magnetic path so that the number of lines of flux cut by the cylinder is increased.

Referring to the figures of the drawing, the improved magnetic damper includes a housing 10 consisting of rectangular top and bottom plates 20 and 22, and opposed permanent magnets 46 and 48. The top and bottom plates 20 and 22 can be secured to the magnets 46 and 48, by suitable means, such as screw members 23. A cylinder 24 of material having a low electrical resistance is rotatably mounted within the housing 10 between the magnets by means of a web 26 that has an aperture 28 therein to receive the end 29 of a shaft 30.

A bearing 32, provided in the top plate 20, rotatably supports end 31 of the shaft 30. A second bearing 34, mounted adjacent the end of a hollow cylindrical sleeve 36, rotatably supports the other end 29 of the shaft 30. The sleeve 36 is formed of magnetic material, and is secured to the top plate 20 by screws 38.

A spacer 40 is interposed between the bearing 34 and the web 26. A nut 42, screwed on the threaded end 29 of shaft 30 and engaging the web 26, is utilized to retain the cylinder 24 on the shaft 30. A second sleeve 44, substantially the same as sleeve 36, is mounted on the bottom plate 22 by suitable means, such as screws.

The permanent magnets 46 and 48, previously referred to nearly surround the cylinder 24 to provide a magnetic field of the required strength. To complete the magnetic path, a pair of pole pieces 50 and 52 are inserted between the permanent magnets 46 and 48 and extend into close spaced relation to said cylinder.

The path of the flux from each of the permanent magnets 46 and 48 includes the pole pieces 50 and 52, the cylinder 24, and the sleeves 36 and 44. Because of the length of the cylinder 24 and the correspondingly larger permanent magnets 46 and 48 and pole pieces 50 and 52, a larger number of lines of force are cut by the cylinder 24 than would be cut by a disc of comparable inertia, resulting in increased eddy currents being induced in the cylinder 24. This arrangement, therefore, provides an improved damping effect, while the inertia of the cylinder 24 remains at a value that is low relative to that of a disc.

Obviously many modifications and variations of the present invention are possible in light of the above teachings. It is, therefore, to be understood that within the scope of the appended claim the invention may be practiced otherwise than as specifically described.

What is claimed is:

A magnetic damper including a housing having top and bottom plates, a pair of permanent magnets mounted in spaced confronting relation between the plates and a pair of pole pieces mounted between the magnets; a cylinder having a centrally disposed web, a pair of cylindrical sleeves fixed in opposed relation in the housing and extending within the cylinder, said sleeves being formed of magnetic material and said cylinder being formed of low resistance material, and opposed ends of the sleeves confronting opposite faces of the web, and means rotatably mounting the cylinder in the housing in spaced relation to the pole pieces, said means including a shaft extending through and fixed to said web and extending through one of said sleeves and said top plate, and bearings in said sleeve and top plate for journaling said shaft.

References Cited in the file of this patent

UNITED STATES PATENTS

| 469,800 | Wood | Mar. 1, 1892 |
| 590,648 | Pratt | Sept. 28, 1897 |
| 1,098,753 | Podlesak | June 2, 1914 |
| 1,298,465 | Dean | Mar. 25, 1919 |
| 2,622,707 | Faus | Dec. 23, 1952 |
| 2,653,257 | Sailer | Sept. 22, 1953 |

FOREIGN PATENTS

| 446,159 | Great Britain | Oct. 22, 1935 |